United States Patent
Hemon et al.

(10) Patent No.: US 10,962,194 B1
(45) Date of Patent: Mar. 30, 2021

(54) MOTOR VEHICLE LIGHT GUIDE AND REFLECTIVE COUPLER SYSTEM FOR OUTBOARD HOMOGENOUS LIT APPEARANCE OF LAMP MODULE

(71) Applicant: Valeo North America, Inc., Troy, MI (US)

(72) Inventors: Julien Hemon, Troy, MI (US); Alan Gonzalo Silva, Troy, MI (US)

(73) Assignee: Valeo North America, Inc., Troy, MI (US)

( * ) Notice: Subject to any disclaimer, the term of this patent is extended or adjusted under 35 U.S.C. 154(b) by 0 days.

(21) Appl. No.: 16/714,725

(22) Filed: Dec. 14, 2019

(51) Int. Cl.
| | |
|---|---|
| *G02B 6/42* | (2006.01) |
| *F21S 43/243* | (2018.01) |
| *F21S 41/24* | (2018.01) |
| *F21S 43/245* | (2018.01) |
| *F21S 43/239* | (2018.01) |
| *F21V 8/00* | (2006.01) |
| *F21Y 103/10* | (2016.01) |
| *F21Y 115/10* | (2016.01) |

(52) U.S. Cl.
CPC ............. *F21S 43/243* (2018.01); *F21S 41/24* (2018.01); *F21S 43/239* (2018.01); *F21S 43/245* (2018.01); *G02B 6/0036* (2013.01); *F21Y 2103/10* (2016.08); *F21Y 2115/10* (2016.08)

(58) Field of Classification Search
CPC .. G02B 6/0036; G02B 6/0038; G02B 6/0033; G02B 6/0045; G02B 6/0021; G02B 6/0023; F21S 8/00; F21S 8/10; F21S 41/243; F21S 41/24; F21S 43/241; F21S 43/20; F21S 43/249; F21S 41/239
See application file for complete search history.

(56) References Cited

U.S. PATENT DOCUMENTS 7,639,918 B2  12/2009  Sayers et al.
7,686,497 B2  3/2010  Kropac et al.
(Continued)

FOREIGN PATENT DOCUMENTS

EP  3112215 A1  4/2017

OTHER PUBLICATIONS

EP 3 112 215 A1 English Translation Abstract.

*Primary Examiner* — Karabi Guharay
(74) *Attorney, Agent, or Firm* — Valeo North America, Inc.

(57) ABSTRACT

The subject inventive arrangement extends the width of a light-reflective coupler to be offset behind a successive coupler that creates an additional angled reflective surface that apportions light towards an outboard side rather than towards the primary optical axis direction and controls to redirect light at specific angles or enhances light distribution spread so as to improve lighting effects and enhance vehicle appearance. The present invention relates to automotive lighting modules that include multiple light sources a light guide, light-reflective couplers, optical facets, a light-exit face and a light-guiding portion. Coupler profiles are formed by a curved facet and a joined angled facet where associated couplers are juxtaposed and offset from adjoining couplers. Angled surfaces include multiple light reflecting facets adapted to receive collimated light, which are directed towards a vehicle's outboard side. Each coupler's curved facet receives other collimated light directed towards a forward direction of the vehicle.

15 Claims, 7 Drawing Sheets

(56) References Cited

U.S. PATENT DOCUMENTS

| | | | | |
|---|---|---|---|---|
| 8,061,880 B2 * | 11/2011 | Lambert | ............... | F21S 43/243 |
| | | | | 362/511 |
| 9,574,731 B2 * | 2/2017 | Giraud | ................ | G02B 6/0018 |
| 2005/0065798 A1 * | 3/2005 | Kunstler | ............... | F21S 43/241 |
| | | | | 362/545 |
| 2015/0233539 A1 | 8/2015 | Sagna et al. | | |
| 2015/0247613 A1 * | 9/2015 | Doha | ................ | G02B 6/0036 |
| | | | | 362/507 |

\* cited by examiner

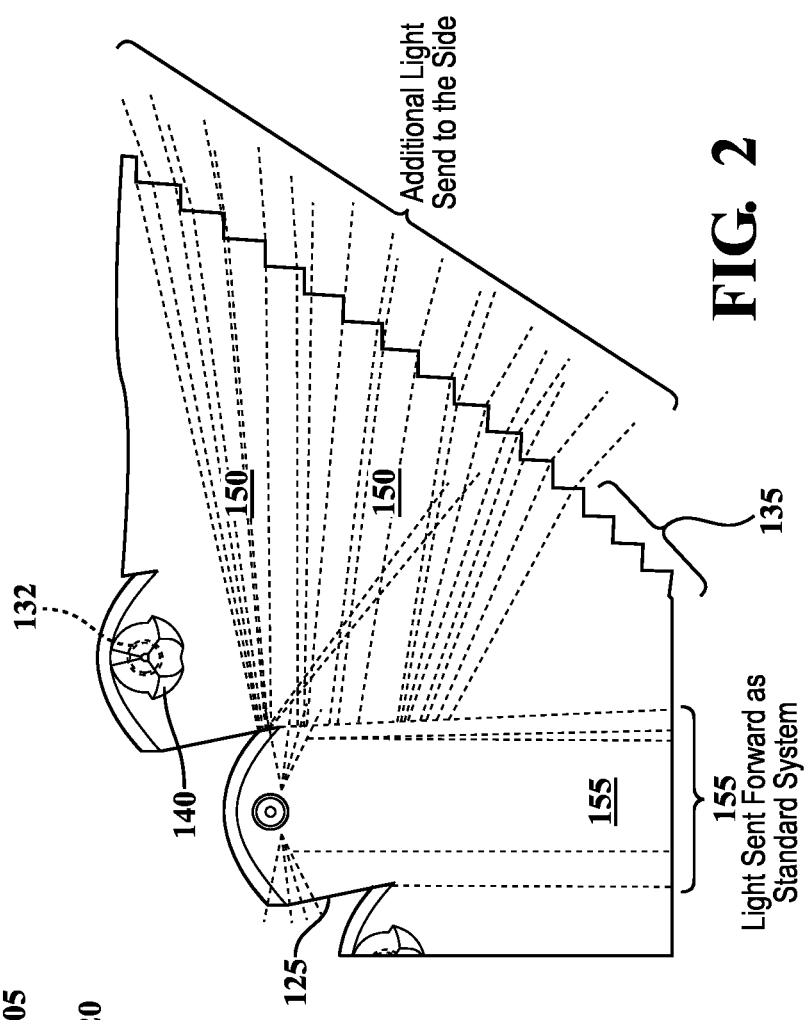
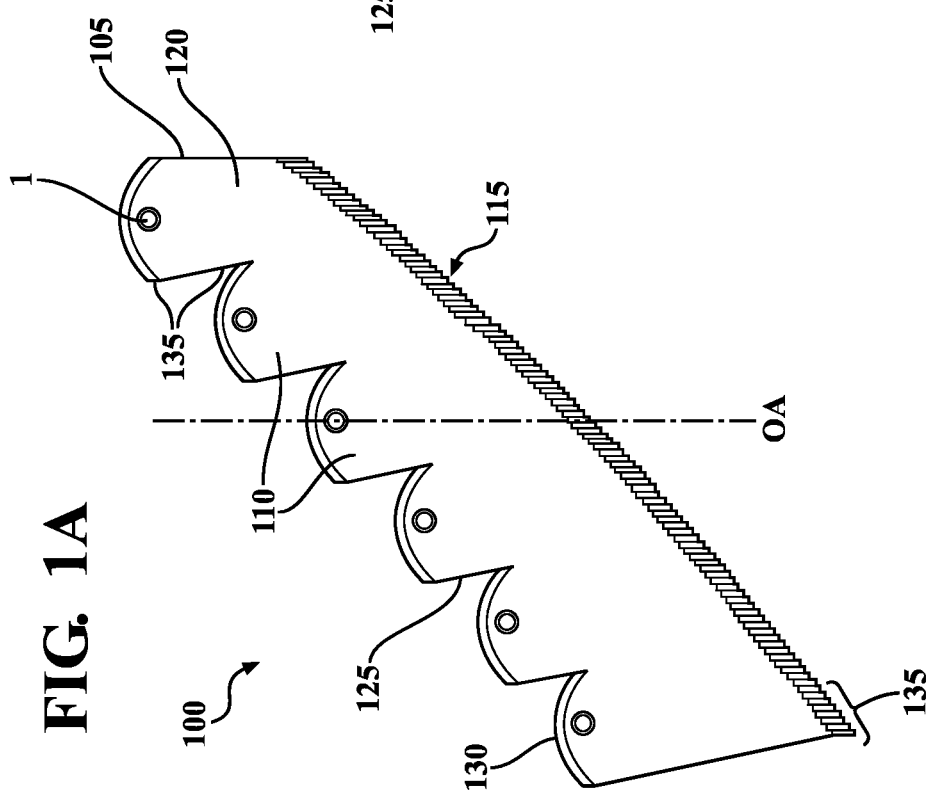

MOTOR VEHICLE LIGHT GUIDE AND REFLECTIVE COUPLER SYSTEM FOR OUTBOARD HOMOGENOUS LIT APPEARANCE OF LAMP MODULE

FIELD OF THE INVENTION

The present invention relates to lighting or signaling devices for motor vehicles, and more particularly, to a light guide and light-reflective coupler system of a motor vehicle light-signaling module.

BACKGROUND

Efforts to improve outboard lit appearance of vehicle lamps is an on-going endeavor among Original Equipment Manufacturers (OEM) and the numerous component/system suppliers. Of particular interest is the desire to improve the outboard lit appearance to be uniform while meeting homogeneity and regulation requirements. The present invention is directed to one such innovation solution and provides a lighting or signaling device that can improve outboard lit appearance while still meeting homogeneity and regulation requirements.

Known vehicle lamp optical devices include a light guide to provide different lighting and signaling functions. In particular, a light guide with multiple light sources is designed to transmit a generated light beam towards a vehicle's forward direction. Furthermore, optical device components include a plurality of light-coupling reflectors (a.k.a. "couplers"), a light-exit face and a light guiding portion that connects the couplers with the light-exit face. Such known optical device components are not designed to send the light towards an outboard/side of the vehicle instead of being directed toward the vehicle's front side.

Among the literature that may pertain to this technology includes patent documents: U.S. Pat. No. 7,639,918 B2 and U.S. Pat. No. 7,686,497 B2; U.S. Publication US 2015 0233 539 A1, all incorporated herein by reference for all purposes.

Thus among various objectives that the subject invention addresses is an objective to apply a multi-light sourced light-guide system via enhanced light-effect control, lighting efficiency and an improved photometry arrangement. Another objective is to increase light distribution spread to meet lighting homogeneity and regulatory requirements. Another objective is to improve efficiencies by directing generated waste light or bleed-light to the side of a vehicle. And yet another objective is to achieve a brighter lit aspect and visibility along an outboard side light-emitting face of vehicle lamp modules.

The invention herein overcomes one or more of the problems and shortcomings of the known mentioned optical device components and associated generally known limitations of optical devices with restricted light direction.

SUMMARY OF THE INVENTION

The present invention is directed to a unique solution to one or more of the problems discussed above. It is believed that the present invention provides a lighting and/or signaling device that can improve the outboard lit appearance while producing an efficient and uniform light beam. In particular, the present invention provides an optical device having a light guide comprising couplers with optics on one of its side surfaces where the optics with the coupler's associated surfaces are adapted to direct a portion of the light beam towards a vehicle's outboard side. Thus, improving a vehicle's side outboard lit appearance or lighting effect.

Accordingly pursuant to a first aspect of the present invention, there is contemplated an optical device for a motor vehicle, the optical device comprising: a plurality of light sources; and a light guide having an optical axis, the light guide comprises: a plurality of couplers, a light-exit face, and a light guiding portion connecting the couplers and the light-exit face; wherein each coupler is arranged to receive a light beam from at least one light source and redirects a portion of the received light beam to generate a collimated light beam, wherein a profile of each coupler is formed by a curved facet and an angled facet surface joined to the curved facet, wherein the couplers are juxtaposed and offset from a successive or an adjoining coupler to create the angled facet surface, and each angled facet surface includes a plurality of light reflecting facets; wherein the curved facet of each coupler is adapted to receive other portions of the collimated light beam and directs the other portion towards a forward direction of the vehicle via the light guiding portion and the light-exit face; and wherein the plurality of light reflecting facets of the angled facet surface of each coupler is adapted to receive another portion of the collimated light beam and directs the other light beam portion towards an outboard side of the vehicle via the light guiding portion and the light-exit face.

The invention may be further characterized by one or any combination of the features described herein, such as a light-exit face that includes a plurality of stepped surface facets adapted to transmit, reflect or diffuse light at the light-exit face; the plurality of reflecting surfaces are a plurality of prisms, preferably juxtaposed elements; the at least one light source is disposed at a top of a coupler and is substantially orthogonal to the optical axis of the light guide; the light guiding portion comprises an upper face and a bottom face that are parallel and interconnected by the light-exit face; the thickness dimension of the couplers is the same as the thickness dimension of the light guiding portion; the light beam portions from the curved facets travel along the optical axis of the light guide; the angled surfaces are angled with respect to the optical axis; each coupler comprises a collimator to collimate the received light beam; the light guide and the at least one optical coupler are comprised of a single polymeric piece; the optical device functions to provide lighting, signaling or both for the motor vehicle; and the collimated light beam that is directed from the coupler's angled surface facets to the light-exit face is in the form of a beam of parallel rays; the plurality of couplers are oriented spaced along an Y-axis and the plurality of light sources are positioned along a Z-axis; and the plurality of couplers are oriented in the direction of the light guide extrusion.

Accordingly pursuant to a second aspect of the present invention, there is contemplated a lighting and/or signaling device for a motor vehicle, the lighting and/or signaling device comprising: a reflector assembly; a lens; a housing; and an optical device, wherein the optical device comprises: a plurality of light sources; a light guide having an optical axis, where the light guide comprises: a plurality of couplers, a light-exit face, a light guiding portion connecting the couplers and the light-exit face; wherein each coupler is arranged to receive a light beam from at least one light source and collimates the received light beam to generate a collimated light beam, wherein a profile of each coupler is formed by a curved facet and an angled facet joined to the curved facet, wherein the couplers are juxtaposed and offset from a successive or an adjoining coupler to create the angled facet surface, and each angled facet surface includes a plurality of light reflecting facets; wherein the plurality of light reflecting facets of the angled facet surface of each coupler is adapted to receive a collimated light beam portion and directs the collimated light beam portion towards a vehicle's side via the light guiding portion and the light-exit face; and wherein the curved facet of each coupler is adapted to receive other collimated light beam portions and directs the other collimated light beam portions towards a forward direction of the vehicle via the light guiding portion and the light-exit face.

It should be appreciated that the above referenced aspects and examples are non-limiting, as others exist within the present invention, as shown and described herein.

DESCRIPTION OF DRAWINGS

FIG. 1A shows an exemplary view of an optical lighting device for a motor vehicle, according to the present invention.

FIG. 2 shows a generated light beam or light ray distribution path of optical device operation from FIG. 1A, according to an embodiment of the present invention.

DETAILED DESCRIPTION OF THE PREFERRED EMBODIMENTS

The present invention provides a lighting and/or signaling device that can improve the outboard side lit appearance, while producing an efficient and uniform light beam.

Figure 1C:
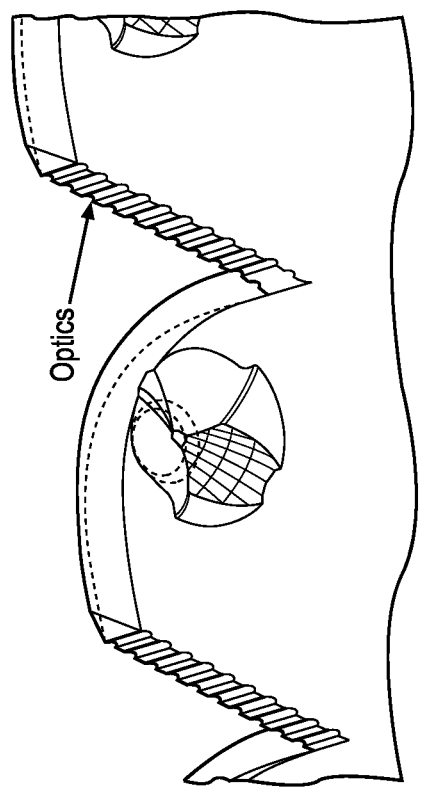
FIG. 1C shows an aspect of coupler features illustrating optics locations along angled surfaces relative to light sources in view of FIG. 1A's optical lighting device, according to the present invention.
Figure 1B:
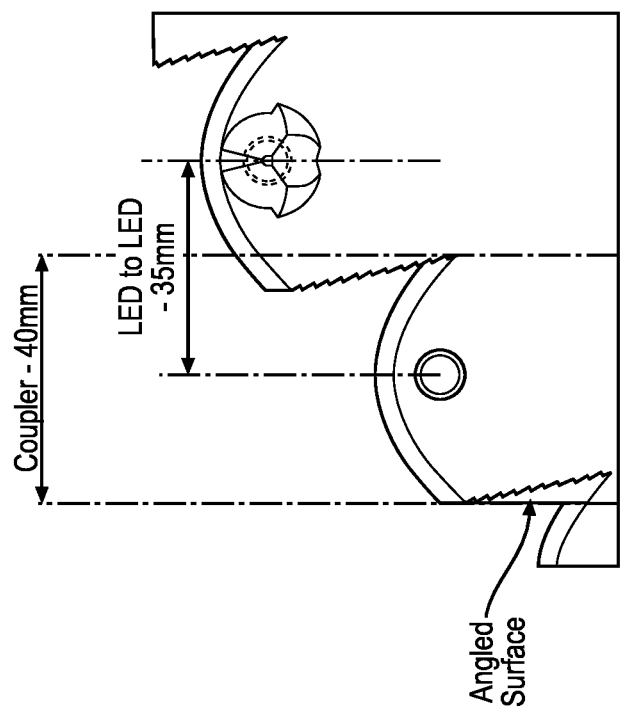
FIG. 1B shows an aspect of coupler features depicting angled surface and spacing relative to light source locations in view of FIG. 1A's optical lighting device, according to the present invention.

Of particular interest and main focus of the present disclosure is to provide an optical device having a light guide as illustrated in associated figures. FIG. 1 shows a perspective view of an optical device for a motor vehicle, according to the present invention.

For greater simplicity, in the following, reference will be made to the orthonormal reference frame shown in the various figures, in which the X-axis direction may represent the direction of the optical axis and of a longitudinal direction, where the Y-axis direction is perpendicular to the X-axis direction and forms together a horizontal plane. The Z-axis may represent a vertical direction, which is perpendicular to the horizontal plane (represented by X and Y-axes). The Y-axis may correspond to width of the optical device, LAX-axis may correspond to width of the optical device and the Z-axis may correspond to height of the optical device.

Unless defined otherwise, all technical and scientific terms used herein have the same meaning as commonly understood by one of ordinary skill in the art to which this technology belongs.

FIG. 1's depicted Optical device 100 comprises a plurality of light sources 1 and a light guide 105 having an optical axis (OA). Light guide 105 comprises a plurality of couplers 110, a light-exit face 115 and a light guiding portion 120 that connects couplers 110 and the light-exit face 115. It is contemplated that the relationships (e.g. at least the geometric properties and the material properties) between associated components and component assemblies are surprisingly important in solving one or more issues described in the background section above. Each of the components and component assemblies and their relationships are disclosed in greater detail and specifically in the following paragraphs.

Light source 1

Light source 1 represents a visually perceived source of electromagnetic radiation or an energized source of visually perceived radiant energy (inclusive of "Visible" light within the electromagnetic spectrum) but may include a broad combination or range of electromagnetic or radiant energy inclusive from among X-rays, ultraviolet and infrared energy, micro-wave and radio-wave spectrums. The light source may include every conventional and suitable lighting element sources such as filament-based or incandescent lamps, fluorescent lamps, arc or gas-discharge type lights, light emitting diodes (LED), or other suitable conventional sources.

The plurality of light sources are preferably of type Light Emitting Diodes (LEDs). Light sources 1 are disposed at a predetermined point with respect to the light guide 105. In an example, the light sources are arranged on a printed circuit board (PCB) (represented by 133 but not illustrated) located about or integrated within optical device 100 (i.e. light sources are arranged in such a way by example in FIG. 3A that light sources face a bottom face of the light guide 105). PCB 133 may be used to power, to control and to carry the light sources. It will be understood that the number of light sources may depend on the light guide 105 dimensions. It will be noted that the emission of light axis L from each light source is perpendicular to the light guide 105. In an embodiment, the plurality of light sources 1 may be arranged on a single PCB. In another embodiment, the plurality of light sources 1 may be arranged on different PCBs.

Angled Facet 125; Curved Facet 130

Angled facet 125 and Curved facet 130 function as a plurality arrangement-series of light reflecting surfaces formed on a light-emissive body 120 and may include geometric forms that provide particular optical effects upon having contact with light—either by light striking, penetrating or via reflection through the produced surface form pattern or geometric formation. Curved facets 130 are adapted to receive portions of collimated light from coupler 110 and direct such light portions towards a vehicle's forward direction in alignment with optical axis OA via light guiding portion 120.

Optics 135

Optics or Light-reflecting facets 135 function as an arrangement-series of geometric forms on a light-emissive body (e.g. pattern formed on lens material surface) and may include a formed cut, protrusion, impression, a particular form pattern, formations with numerous facets so as to provide particular optical effects upon having contact with light—either by light striking, penetrating or via reflection through the produced form pattern or geometric formation. The light distribution facets may conform to/with geometric shapes inclusive of . . . simple geometric triangle, square, diamond, quadrilateral, polygonal, spherical, dome or beaded, dimpled, conical, concave, convex or such similar forms or other customized forms.

Lateral Axis LAX

Lateral axis LAX functions as a reference axis line that defines a lateral direction along which light propagates through an optical system along which there is some degree of rotational symmetry. The term "Lateral axis" is used herein to refer to an imaginary line or functions as a rotational plane that defines a path along which light propagates.

Light-Emission Axis L

Light emission axis L functions as a reference axis line that defines the principal light path from a single point light source towards the target point direction along which the light propagates.

Light Guide 105

The Light guide 105, which may be a refined component of Light-emissive medium 120 or Light guiding portion 120, functions as the material body that a light wave (inclusive of electromagnetic particle or varying-spectrum light waves) passes through. For example, light waves traveling through or passing-through a guiding material or a "medium" material. Light guide 105 may be constructed or formed from a unitized, integral or from a combination of constituent body components. Light-emissive medium 120 material may include rigid bodies or a material body of varying flexibility or a material body of relative elasticity or a gel-rubberized material. Light-emissive medium 120 may be formed from a simple geometric or customized shape and may include various colorant or additive features which may interfere with light transmission at various levels yet still allow for light transmission through the "medium" body at various degrees.

The light guide 105 takes the form of a sheet. The term 'sheet' is understood to mean a shape bounded in the direction of the thickness by two faces that are substantially parallel to over another over at least a part of the shape. The shape of the sheet itself may have a non-planar shape. According to an embodiment of the present invention, the light guide 105 is preferably made of a transparent plastic, by means of injection molding. The light guide 105 may be curved, following the curved geometry of headlight of vehicles. In other embodiments, the light guide 105 may be differently curved. However, the present invention is not limited to the curved light guides, but also extends to rectilinear light guides. In an embodiment, the light guide 105 is monolithic, in other words, formed from a single piece, for example by molding of plastic material. The light guide 105 includes the light guiding portion 120 connecting the couplers 110 and the light-exit face 115. The light guiding portion 120 guides the light beam received from the couplers 110 to the light-exit face 115. In an embodiment, the light-exit face 115 includes a plurality of stepped surface facets adapted to transmit, reflect, or diffuse light at the light-exit face.

Optical Axis OA

Optical axis OA functions as a reference axis line that defines the principal light path along which light propagates through an optical system along which there is some degree of rotational symmetry. The term "optical axis" is used herein to refer to an imaginary line or functions as a rotational plane that defines a path along which light propagates.

Coupler 110

A coupler 110 or light-coupling reflector functions to gather surrounding generated light and distribute or redirect such associated generated light in a particular manner or tailored direction (a particular spot, location, randomized direction or a focused target area) using said coupler's reflective surface(s).

The plurality of couplers 110 are adapted to transmit the light from the source towards a forward direction of the vehicle and the outboard side of the vehicle via the light-exit face 115. As shown in the FIG. 3A, optical device 100 comprises multiple optical couplers 110, which are positioned at a light entry face 145 of the light guide 105. It will therefore be understood that couplers 110 are associated with light entry faces of the light guide 105. The couplers 110 are oriented in the extrusion direction of the light guide 105. In other words, the couplers 110 are oriented along the Y-axis (or laterally spaced along depicted LAX). Here in FIG. 1, six optical couplers are shown. It will be understood that the number of couplers 110 are not limited to six and notably depends on the light guide 105 dimensions. The couplers 110 are arranged to receive a light beam from at least one light source 1 and collimate the received light beam to generate a collimated light beam. Each coupler's 110 profile is formed by a curved facet 130 and an angled facet surface 125 joined to one another. As shown in figures, couplers 110 are juxtaposed and offset from a successive or adjoining coupler 110 to create the angled facet surface 125, and each angled facet surface 125 includes a plurality of light reflecting facets 135. In an embodiment, the plurality of reflecting facets 135 are a plurality of prisms, preferably juxtaposed elements.

Each coupler 110 is configured to couple the light of light guide 105 with a respective collimator 140. In an embodiment, thickness dimension of the light guiding portion 120 of light guide 105 is same as the thickness dimension of the couplers 110.

Collimator 140

A collimator 140 or light-reflective coupler functions to gather surrounding generated light and distribute or redirect such associated generated light in a particular or tailored direction (gathered light to be directed in a parallel beam relative to a reference or a particular spot, location, randomized direction or a focused target area).

Collimator 140 may be associated with each coupler 110. The collimator 140 and associated coupler 110 can be in contact. The collimator 140 may include a lens, a reflector, a refractor (not shown in the Figures) or any other means of collimation concave or convex type. The collimator 140 has a top face entrance (145 and shown in FIG. 3A), which is the light entry side adapted to receive light emitted by a light source when the light source is disposed at the top face entrance 145 of the collimator 140. At least one light source 1 may be associated with each collimator 140 and the at least one light source 1 may be disposed in such a way that a collimated light beam emitted by the at least one light source is largely directed with optical axis OA of the light guide 105, in other words the at least one light source emits the light beam in the X-axis direction.

In an embodiment, collimator 140 is adapted to receive the light beam emitted by the associated light source and collimates the emitted light beam. The collimated light beam is then directed toward the angled facet surface 125 and the curved facet 130 of coupler 110.

FIGS. 1A-2 show the operation of the optical device 100, which is described in detail with respect to FIG. 2. FIG. 2 shows a path of light rays produced during optical device's 100 operation, according to the present invention. The path of the light rays is shown in a general manner by reference numerals 150 and 155. In operation, light rays or the light beam emitted by light sources may be collimated by collimators 140 to generate collimated light beams. Collimated light beams are then transmitted towards angled facet surfaces 125 and curved facets 130 of couplers 110, where the angled facet surfaces 125 and the curved facets 130 reflect the collimated beams.

The plurality of light reflecting facets 135 of the angled facet surface 125 of each coupler 110 is adapted to receive a portion of the collimated light beam that is directed towards an outboard side of the vehicle via light guiding portion 120 and light-exit face 115. The path of light rays towards the vehicle's outboard side is shown by illustrated arrows in FIG. 2 denoted by reference numeral 150.

A curved facet 130 of each coupler 110 is adapted to receive other portion of the collimated light beam and directs collimated light beam portions towards a forward direction of the vehicle via the light guiding portion 120 and the light-exit 115. Curved facets 130 are configured to direct the beams along a direction substantially parallel to optical axis OA of the optical device 100, in other words in the X-axis direction. The path of the light rays towards the forward direction of the vehicle is shown by light ray and beam illustration in FIG. 2, and indicated by reference numeral 155

Therefore the present invention's optical device 100 with the vehicle's outboard side lit appearance of the lighting-signaling module is improved compared to conventional optical devices with multiple light sources.

Figure 3A:
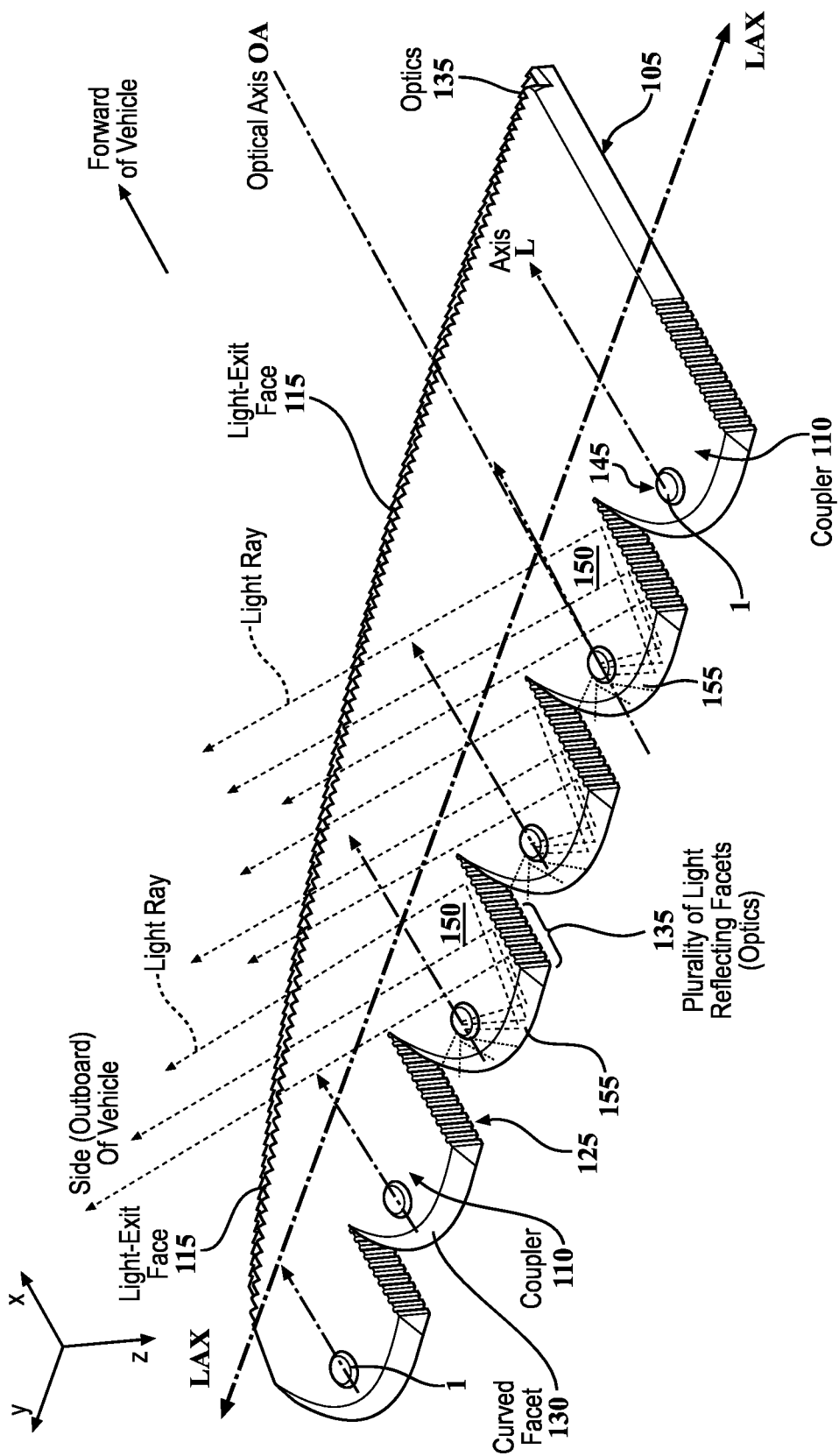
FIG. 3A shows an isometric view of exemplary optical device shown in FIG. 1A, according to the present invention.
Figure 3B:
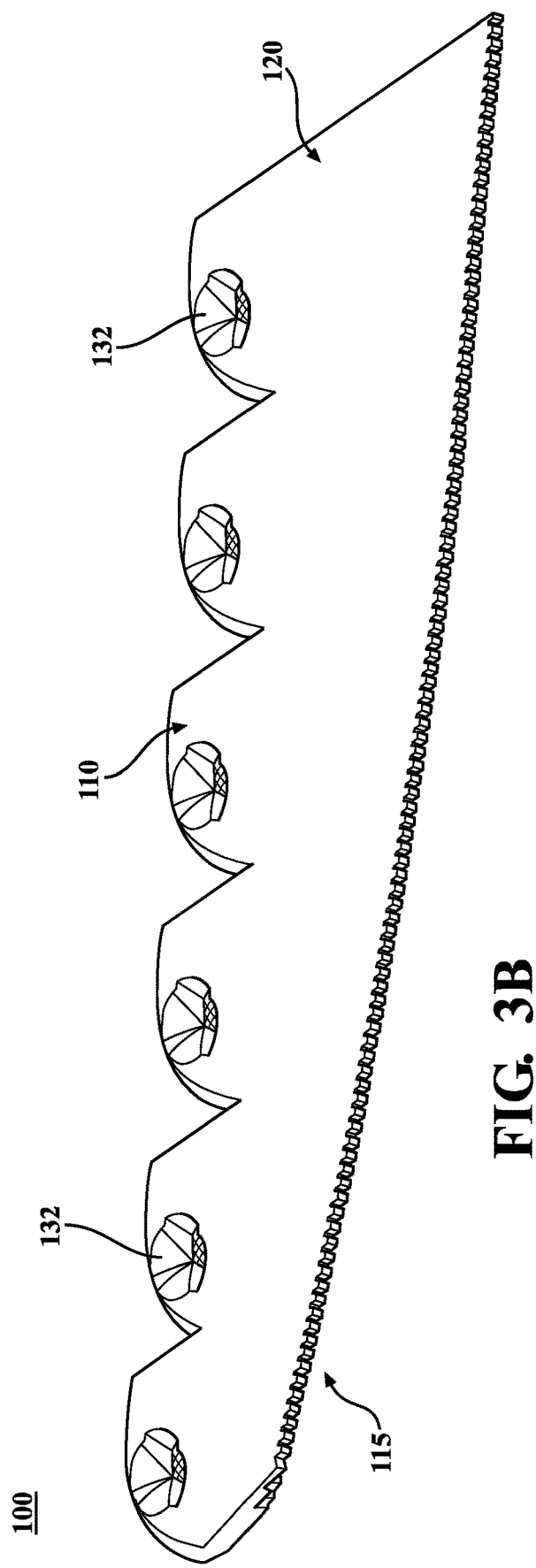
FIG. 3B shows a backside view of exemplary optical device shown in the FIG. 1A, according to the present invention.
Figure 4:
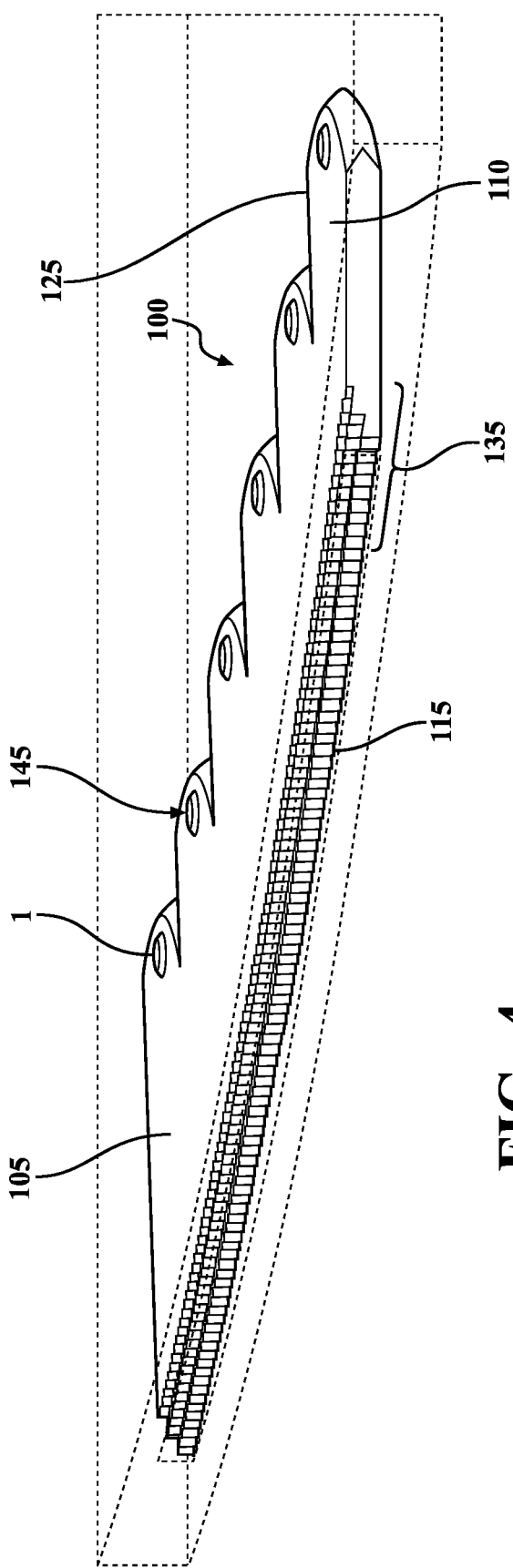
FIG. 4 shows an aspect of an exemplary optical device from an outboard side view, according to the present invention.
Figure 5A:
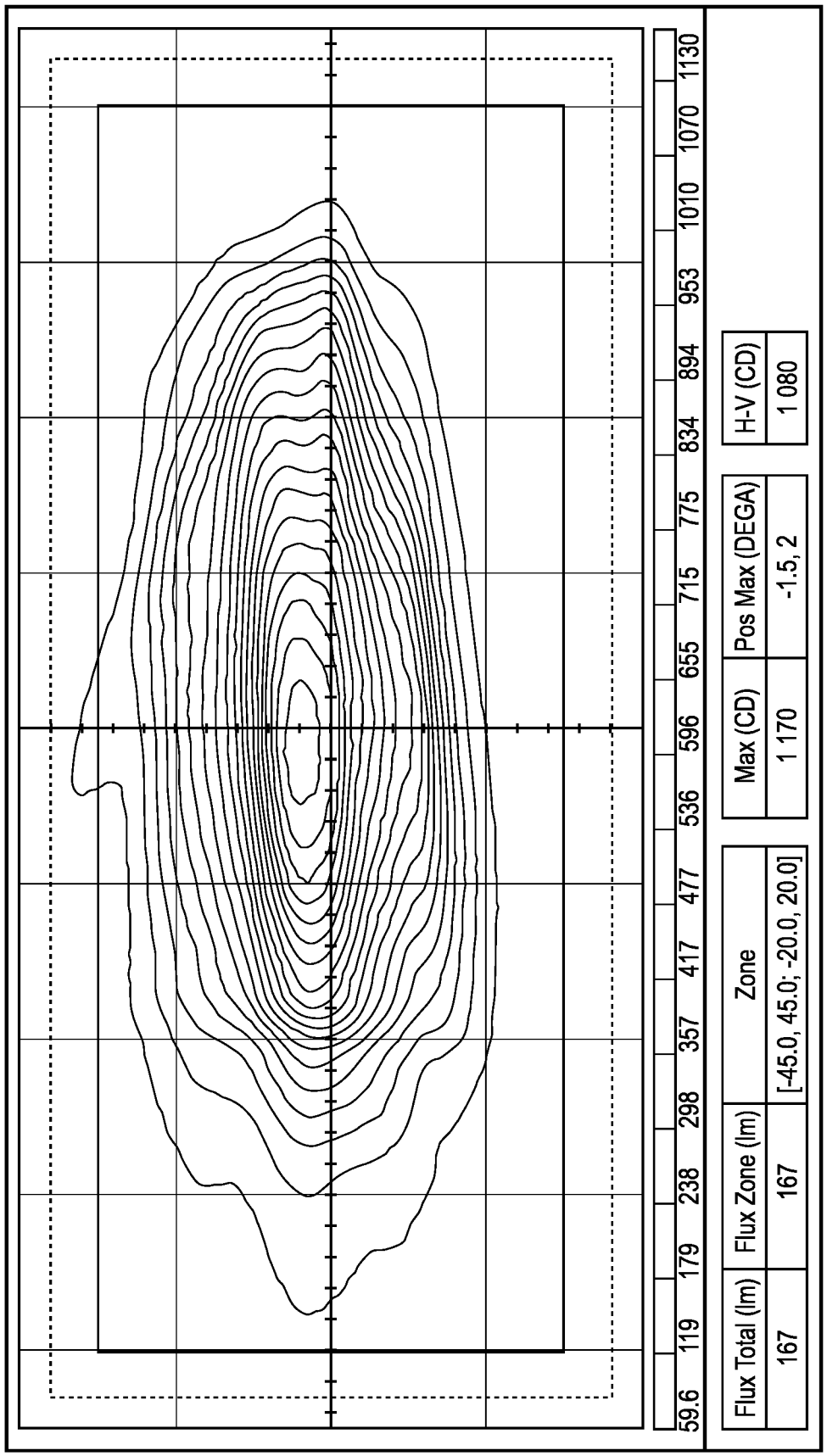
FIG. 5A shows an exemplary photometry distribution of FIG. 4 aspect optical device without applied optics per the subject invention.
Figure 5B:
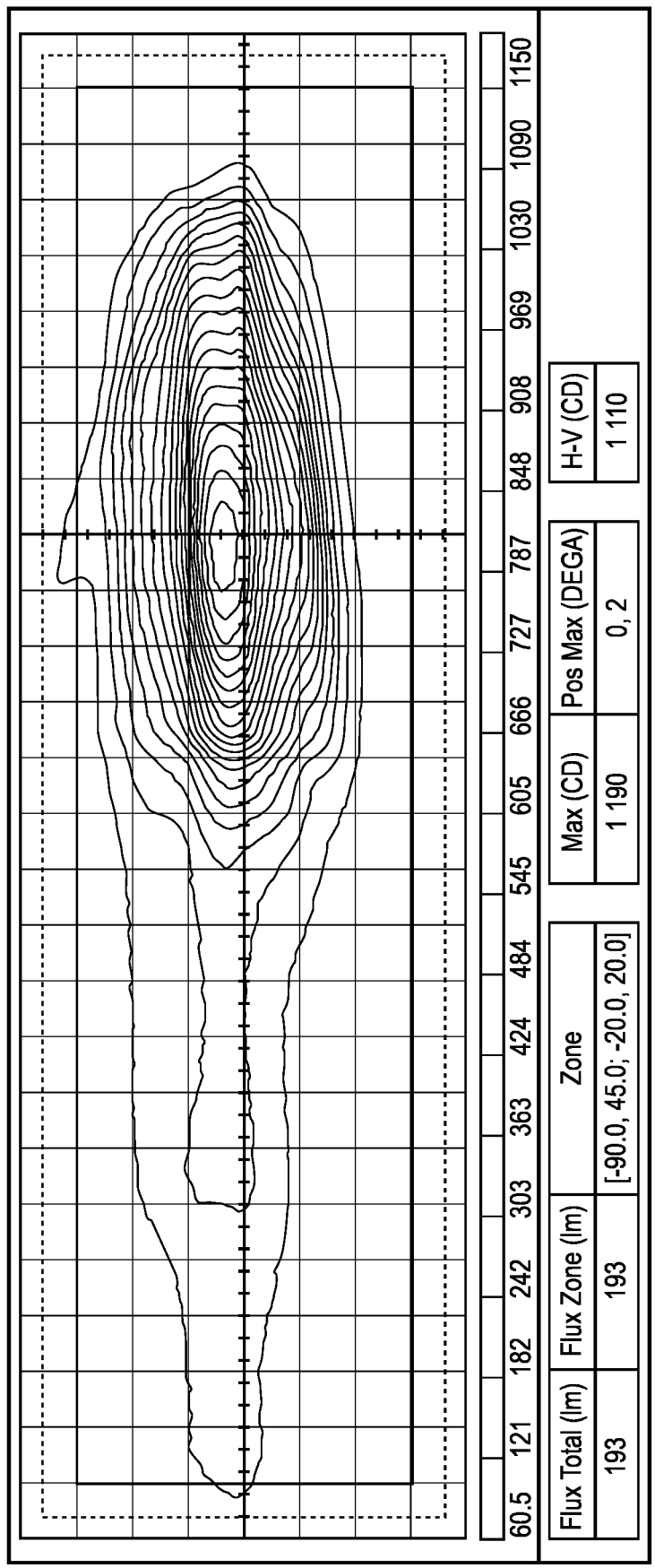
FIG. 5B shows an exemplary photometry distribution of FIG. 4 aspect optical device with outboard lit applied optics, according to the subject invention.

FIG. 3A shows an isometric view of optical device 100 from FIG. 1A, according to the present invention. The face entrance 145 of the collimators 140 are clearly shown in the FIG. 3A. Face entrance 145 is the light entry side adapted to receive light emitted by a light source when the light source is disposed at the face entrance 145 of collimator 140.

In an embodiment, the optical device 100 is monolithic. In other words, formed from a single piece, for example by molding of plastic material, i.e., the light guide, and the at least one optical coupler are comprised of a single polymeric piece.

As shown in the foregoing, optical device 100 of the present invention provides a more efficient and uniform light beam while improving the outboard-lit appearance.

In an embodiment, optical device 100 functions for providing motor vehicle lighting. In another embodiment, optical device 100 functions for providing signaling for the motor vehicle. Yet in another embodiment, optical device 100 functions for providing both lighting and signaling for the motor vehicle.

Although the present disclosure provides references to figures, all of the embodiments shown in the figures are intended to explain the preferred embodiments of the present invention by way of example rather than being intended to limit the present invention. Preferred embodiments of the present invention have been disclosed. However, it should be apparent to a person of ordinary skill in the art that certain modifications would come within the teachings of this invention and that various changes or modifications may be made in the present disclosure without departing from the principles and spirit of the disclosure, which are intended to be covered by the present invention as long as these changes or modifications fall within the scope defined in the claims and their equivalents.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values, which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes.

The term "consisting essentially" of to describe a combination shall include the elements, ingredients, components or steps identified, and such other elements ingredients, components or steps that do not materially affect the basic and novel characteristics of the combination.

LIST OF ELEMENT NUMBERS

Angled surface 125
Top face entrance 145
Light collector 132
Collimator 140
Coupling Reflector or Coupler 110
Curved facet 130
Light Source 1
Lateral Axis LAX
Light guide 105
Light-exit face 115
Light guiding portion—Light-emissive medium 120
Light Emission Axis L
Optical Axis OA
Optical device 100
Optics or Reflecting surfaces 135
Path of light beam reflected from angled facets 150
Path of light beam reflected from curved facets 155
Printed Circuit Board (PCB) 133

The invention claimed is:

1. An optical device of a motor vehicle comprising:
a plurality of light sources; and
a light guide having an optical axis, the light guide comprises: a plurality of couplers, a light-exit face, and a light guiding portion connecting the couplers and the light-exit face;
wherein each coupler is arranged to receive a light beam from at least one light source and collimate the received light beam to generate a collimated light beam, wherein a profile of each coupler is formed by a curved facet and an angled facet surface joined to the curved facet, where each successive coupler of the plurality of couplers is juxtaposed and offset to overlap over an adjoining coupler where each angled facet surface is created, each angled facet including a plurality of light reflecting facets;

wherein the plurality of reflecting facets of the angled facet surface of each coupler is adapted to receive a portion of the collimated light beam and directs the portion towards a side of the vehicle via the light guiding portion and the light-exit face; and wherein the curved facet of each coupler is adapted to receive other portion of the collimated light beam and directs the other portion towards a forward direction of the vehicle via the light guiding portion and the light-exit face.

2. The optical device as claimed in claim 1, wherein the light-exit face includes a plurality of stepped surface facets adapted to transmit, reflect, or diffuse light at the light-exit face.

3. The optical device as claimed in claim 1, wherein the plurality of light reflecting facets include a plurality of prisms that are located juxtaposed to each other.

4. The optical device as claimed in claim 1, wherein the at least one light source is disposed at bottom of a collimator and is substantially orthogonal to the optical axis of the light guide.

5. The optical device as claimed in claim 1, wherein the light guiding portion comprises an upper face and a bottom face that are parallel and interconnected by the light-exit face.

6. The optical device as claimed in claim 1, wherein the thickness of the couplers is same as the thickness of the light guiding portion.

7. The optical device as claimed in claim 1, wherein the other portion of the light beam from the curved facets travel along the optical axis of the light guide.

8. The optical device as claimed in claim 1, wherein the angled facet surfaces are angled with respect to the optical axis.

9. The optical device as claimed in claim 1, wherein each coupler comprises a collimator to collimate the received light beam.

10. The optical device as claimed in claim 1, wherein light guide, and the at least one optical coupler are comprised of a single polymeric piece.

11. The optical device as claimed in claim 1, wherein the optical device functions for providing lighting, signaling or both for the motor vehicle.

12. The optical device as claimed in claim 1, wherein the collimated light beam that is directed from the facets of the couplers to the light-exit face is in the form of a beam of parallel rays.

13. The optical device as claimed in claim 1, wherein the plurality of couplers are oriented along an X-axis component and the plurality of light sources are positioned along a Z-axis component along the light guide's optical axis.

14. The optical device as claimed in claim 1, wherein the plurality of couplers are oriented in the direction of the extrusion of the light guide.

15. A lighting or signaling device for a motor vehicle comprising:
a reflector assembly;
a lens; a housing; and an optical device, wherein the optical device comprises:
a plurality of light sources; and
a light guide having an optical axis, the light guide comprises: a plurality of couplers, a light-exit face, and a light guiding portion connecting the couplers and the light-exit face;
wherein each coupler is arranged to receive a light beam from at least one light source and collimate the received light beam to generate a collimated light beam, wherein a profile of each coupler is formed by a curved facet and an angled facet surface joined to the curved facet, where each successive coupler of the plurality of couplers is juxtaposed and offset to overlap over an adjoining coupler where each angled facet surface is created, each angled facet surface including a plurality of light reflecting facets;
wherein the plurality of light reflecting facets of the angled facet surface of each coupler is adapted to receive a portion of the collimated light beam and directs the light beam portion towards a side of the vehicle via the light guiding portion and the light-exit face; and
wherein the curved facet of each coupler is adapted to receive other portion of the collimated light beam and directs the other portions towards a forward direction of the vehicle via the light guiding portion and the light-exit face.

* * * * *